Oct. 6, 1942.        R. E. REMUND        2,298,232
METHOD AND APPARATUS FOR APPLYING STIMULANT TO PLANTS
Filed June 13, 1940

Inventor
ROBERT E. REMUND
By Chas. C. Reif
Attorney

Patented Oct. 6, 1942

2,298,232

UNITED STATES PATENT OFFICE 2,298,232

METHOD AND APPARATUS FOR APPLYING STIMULANT TO PLANTS

Robert E. Remund, Minneapolis, Minn.

Application June 13, 1940, Serial No. 340,283

2 Claims. (Cl. 47—1)

This invention relates to a plant stimulating device and method of making the same.

It has been discovered comparatively recently that vitamin $B_1$ forms a powerful plant stimulant. This vitamin can be applied to plants in various forms.

It is an object of this invention to provide a device by means of which this vitamin $B_1$ may be very easily and conveniently used by housewives and others in stimulating potted or other plants.

It is a further object of the invention to provide a novel method of making a stimulating device using vitamin $B_1$.

It is more specifically an object of the invention to provide a plant stimulating device in the form of a small piece or stick of wood which has been thoroughly impregnated with vitamin $B_1$, and which can be easily inserted into the earth adjacent the plant so that the vitamin $B_1$ will be gradually released and applied by moisture supplied to said plant.

These and other objects and advantages of the invention will be fully set forth in the following description made in connection with the accompanying drawing in which like reference characters refer to similar parts throughout the several views and in which.

Figures 1, 2, 3:
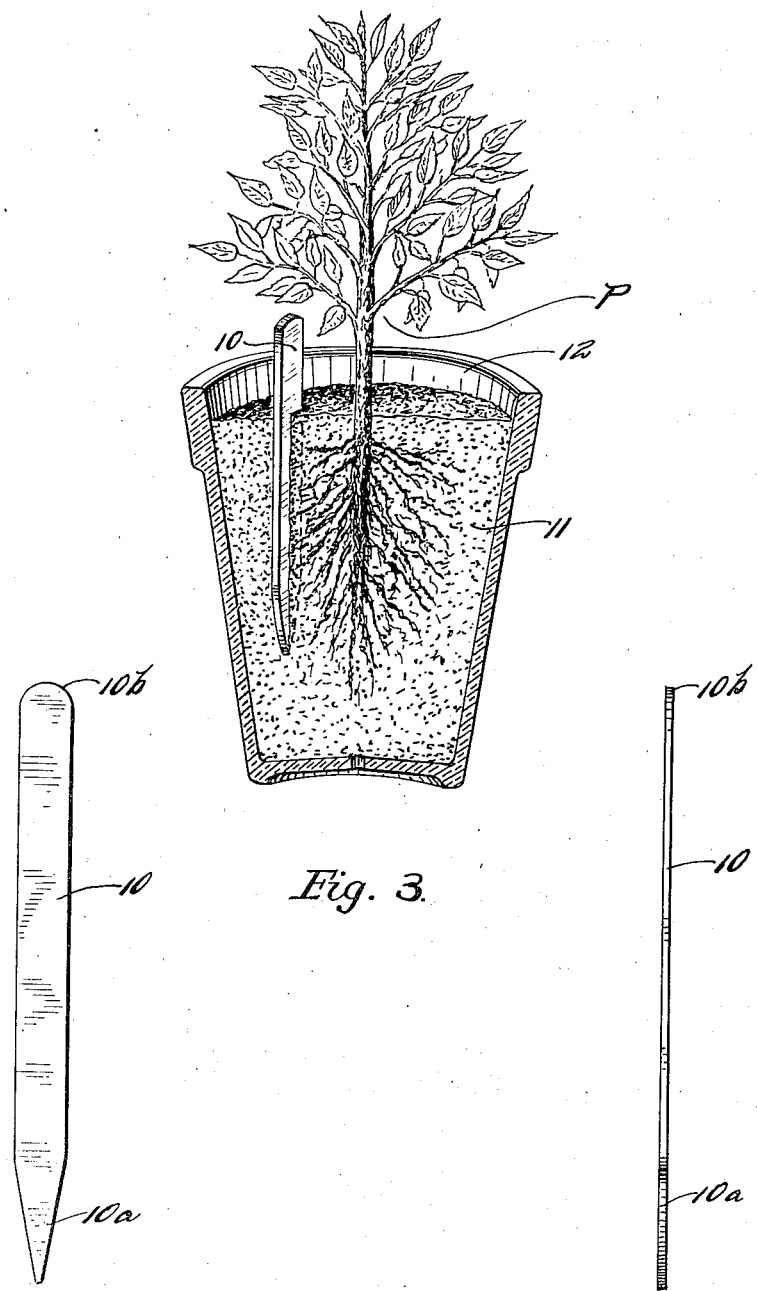
Fig. 1 is a view in side elevation of the device.
Fig. 2 is a view in edge elevation.
Fig. 3 is a sectional view through a potted plant showing the device of the invention in place.

In the practice of the invention a comparatively small stick or piece of wood is formed which preferably is of elongated shape. While the dimensions of this piece of wood might vary through a wide range in practice such a piece as shown as 10 in the drawing has proven very satisfactory. The stick 10 is shown as of small thickness and in one form in practice this thickness has been about $\frac{1}{16}$ of an inch or slightly greater. The width of this particular stick in practice has been substantially $\frac{3}{8}$ of an inch. Stick 10 is shown as having a pointed lower end 10a so that it may be easily and conveniently pushed into the earth. The upper portion of stick 10 has a rounded end 10b so that it may be conveniently handled. The stick 10 is formed of any suitable wood, preferably one that is quite absorbent. In practice some of the softer woods such as pine, birch and balsam have been found suitable. A concentrated solution of vitamin $B_1$ is prepared and this is preferably acidified. In practice the solution has been acidified with hydrochloric acid and the acidity brought up to a pH point of 4. With the solution so prepared the stick 10 is then soaked in this solution until it is thoroughly saturated. While the time of soaking may vary with the kind of wood, temperature and other factors, in practice the stick has been soaked for from a period of 20 to 36 hours. After the stick has been thus soaked and thoroughly impregnated with the solution it is removed from the solution and dried. The water and other liquid pass off from the stick leaving the stick thoroughly impregnated with the vitamin $B_1$ particles or crystals. The stick is then preferably dyed to give it an attractive appearance. While different colors can be used, in practice the stick has been dyed green.

In the use of the device the stick 10 will be pushed downwardly into the earth 11 contained in the flower pot 12 shown in Fig. 1, which pot contains the plant P. The stick will be inserted fairly close to the plant stock or stem so that it will be adjacent the roots. As the plant is watered at regular intervals the water will carry out some of the vitamin $B_1$ and this will be disseminated in the earth about the plant. The stick carries enough vitamin $B_1$ to stimulate the plant with a decided effect for at least thirty days. The vitamin $B_1$ will be gradually released since there will be only a certain amount of water placed on the plant each time. The stick has been tested as to its capacity to release the vitamin $B_1$. The prepared stick was placed in pure water and left there for twelve hours. It was then removed and the water evaporated. The vitamin $B_1$ crystals were then found in considerable quantity in the vessel from which the water had been evaporated. This procedure was repeated three times and each time vitamin $B_1$ crystals were found in the vessel after the water had been evaporated. In practice of course, the stick is not subjected to moisture for any such period.

From the above description it will be seen that I have provided a very simple and efficient stimulating device and method of making the same. The device can be used by housewives and others growing potted and other plants and it will not be necessary to make mixtures of liquids with the attending possibility of spilling the same. The stick can be much more easily applied to the plant and to the soil than can a liquid or powder. The device is thus very clean, efficient, convenient and pleasant in use. The grower if he desires may make any desired marks or records on the stick with a pen or pencil. The device can be easily and inexpensively made and is one which can be quite conveniently marketed. The same has been amply demonstrated in actual practice and found to be very convenient and efficient.

It will, of course, be understood that various changes may be made in the steps and sequence of steps of the method and in the form, details and proportions of the product without departing from the scope of applicant's invention, which generally stated, consists in a method and product such as set forth in the above objects, and such as disclosed and defined in the appended claims.

What is claimed is:

1. A method of making a plant stimulating device which consists in preparing an elongated stick formed so as to be pushed into the earth adjacent a growing plant, forming a concentrated solution of vitamin $B_1$, acidifying said solution, soaking said stick in said solution until it is thoroughly impregnated with said solution and then drying said stick so that the solid particles of said vitamin remain therein and may be released in said earth by moisture said acidifying acting to stabilize said solution so that said stick can be used over a long period.

2. A stimulating device for plants comprising an elongated piece of wood, said pieces being of comparatively small thickness and of much greater width than thickness so as to have a large surface in comparison with its cross sectional area, said stick being treated by being immersed in an acidified solution of vitamin $B_1$ so that said stick is thoroughly impregnated with particles of said vitamin whereby when it is placed in the earth said vitamin will be released over a long period as said earth is watered.

ROBERT E. REMUND.